US010706002B2

(12) United States Patent
Troia

(10) Patent No.: US 10,706,002 B2
(45) Date of Patent: Jul. 7, 2020

(54) RESOURCES SHARING AMONG VEHICLE APPLICATIONS CONNECTED VIA A BUS

(71) Applicant: Micron Technology, Inc., Boise, ID (US)

(72) Inventor: Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/920,240

(22) Filed: Mar. 13, 2018

(65) Prior Publication Data

US 2019/0286607 A1    Sep. 19, 2019

(51) Int. Cl.
*G06F 13/42* (2006.01)
*G06F 13/38* (2006.01)

(52) U.S. Cl.
CPC ...... *G06F 13/4282* (2013.01); *G06F 13/4265* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 6,141,710 A | 10/2000 | Miesterfeld | |
| 6,205,400 B1 | 3/2001 | Lin | |
| 9,734,119 B1 | 8/2017 | Chetverikov et al. | |
| 2009/0024775 A1 | 1/2009 | Costin et al. | |
| 2012/0151098 A1* | 6/2012 | Sullivan | G06F 1/1607 710/13 |
| 2013/0080673 A1* | 3/2013 | Feehrer | G06F 13/24 710/268 |
| 2015/0149661 A1 | 5/2015 | Kanigicherla et al. | |
| 2017/0270001 A1* | 9/2017 | Suryanarayana | G06F 11/1092 |
| 2017/0371698 A1* | 12/2017 | Paolino | G06F 9/45558 |
| 2018/0136652 A1* | 5/2018 | Jiang | G05D 1/0088 |

OTHER PUBLICATIONS

NVM Express, Revision 1.2, Nov. 3, 2014.
Single Root I/O Virtualization and Sharing Specification, Revision 1.1, Jan. 20, 2010.
International Search Report and Written Opinion, PCT/US2019/018946, dated Jun. 17, 2019.

* cited by examiner

*Primary Examiner* — Scott C Sun
(74) *Attorney, Agent, or Firm* — Greenberg Traurig

(57) ABSTRACT

A vehicle having a plurality of application boards connected to a storage device via a bus, such as a Peripheral Component Interconnect Express (PCI Express or PCIe) bus. The storage device presents on the bus a plurality of virtual storage devices via virtualization of a set of resources of the storage device (e.g., in accordance with Single Root Input/Output Virtualization (SR-IOV) or Multi Root Input/Output Virtualization (MR-IOV)). The virtual storage devices are assigned to the plurality of application boards respectively. The bus and/or the storage device facilitates communications among the plurality of application boards and resource sharing.

20 Claims, 3 Drawing Sheets

RESOURCES SHARING AMONG VEHICLE APPLICATIONS CONNECTED VIA A BUS

FIELD OF THE TECHNOLOGY

At least some embodiments disclosed herein relate to computing devices of vehicles in general and, more particularly but not limited to computer storage devices of vehicles.

BACKGROUND

Typical computer storage devices, such as hard disk drives (HDDs), solid state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid state drives, and both in hybrid drives.

When a computer storage device is attached to a host computer, the host computer may use a standardized logical device interface protocol to address the computer storage device in a way independent from the specific media implementation of the storage device.

For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

A PCI-SIG Single Root I/O Virtualization and Sharing Specification defines extensions to PCIe. The extensions allow a software component to share PCIe hardware resources via accessing virtual functions implemented in the PCIe hardware. An NVMe specification suggests that a controller that supports Single Root Input/Output Virtualization (SR-IOV) should implement fully compliant NVMe virtual functions.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
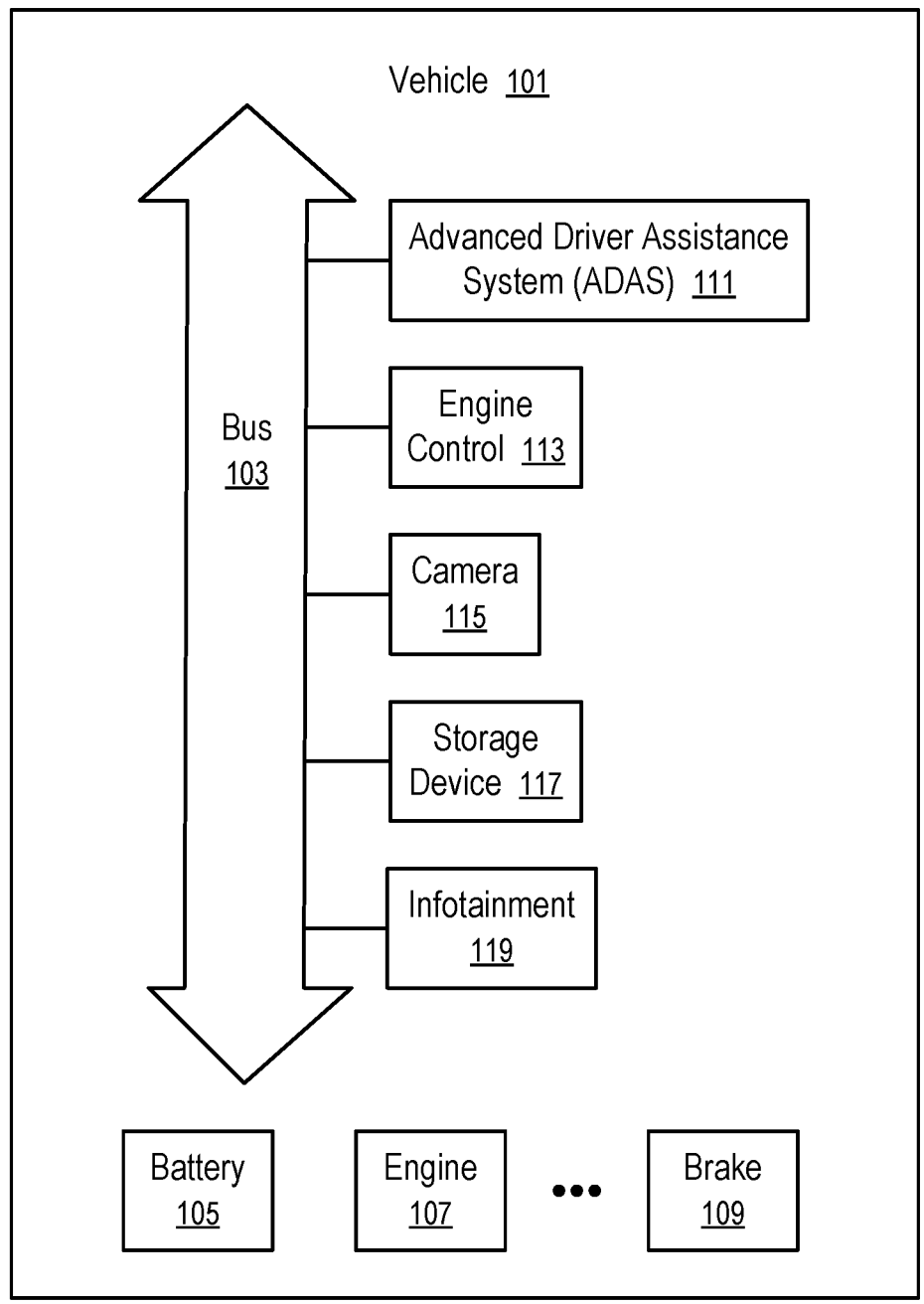
FIG. 1 shows a vehicle having computing devices connected via a bus to share resources according to one embodiment.

At least one embodiment disclosed herein includes a vehicle having multiple application boards connected to a storage device via a bus, such as a PCIe bus, to share the storage capability of the storage device using virtual functions implemented in the storage device. The PCIe bus and/or the storage device can be used to facilitate communications among the vehicle application boards, such as a circuit board having components implementing a function of an advanced driver assistance system (ADAS), an infotainment system, an engine control, a camera, etc.

Conventional vehicle application boards, such as printed circuit boards having components installed there for the engine control, the braking system, the infotainment system, etc., are designed to operate independent from each other. Such vehicle application boards have their own local memory for storage of data and code in general. Some boards may have special purpose ports for add-on capabilities or capacities that extends the functionality of the boards.

For example, some boards may have ports configured to accept flash memory devices; and a flash memory device can be inserted into the port of such a board to extend the memory capability of the board.

For example, some boards may have ports configured to accept Wi-Fi modules; and a Wi-Fi module can be inserted into the port of such a board to extend or enable the wireless local area network communication capability of the board.

In at least some embodiments disclosed herein, a PCIe bus is provided on a vehicle to connect the vehicle application boards to one or more shared resources, such as storage devices. Thus, the cost of the boards can be optimized via the sharing of the unused storage capability of a single device among the boards that are connected to the PCIe bus in a vehicle.

For example, an application board may be manufactured with the minimum amount of memory installed; and the temporary data and/or infrequently used data can be stored in a shared data storage device, such as a solid state drive (SSD), that is connected to the PCIe bus. Thus, the storage capacity of one or more application boards installed on a vehicle can be extended through the provision of a shared storage device on the PCIe bus and/or enhanced via the upgrading of the shared storage device on the PCIe bus. The PCIe bus can be routed inside the vehicle to connect the application boards of the vehicle. Further, the PCIe bus also allows the extension of the capability of the vehicle system by connecting more storage devices and/or other peripherals, such as cameras, sensors, data processing units, tools, and gadgets for sharing by the application boards. When the additional peripherals and/or application boards are present on the bus, the software/firmware of the existing application boards can be upgraded or configured to extend their capabilities to provide new services based on communications and/or collaborations with the additional peripherals and/or boards. The peripherals and/or boards on the bus can communicate with each other (e.g., in the form of streams of data for read or write operations) without a need for a separate computer network. The PCIe bus can be used as a global bus between vehicle applications to communicate with each other (e.g., to exchange service messages among vehicle applications), share resources (e.g., front camera, rear camera, sensors, actuators). Thus, the bus provides the opportunity to interconnect different application boards and/or peripherals to provide advanced and/or integrated services and to improve the scalability of the in-vehicle computing system.

FIG. 1 shows a vehicle (101) having computing devices connected via a bus (103) to share resources according to one embodiment.

A typical vehicle (101) has an engine (107), a brake (109), and other components for driving, steering, accelerating, stopping, etc. Some of the components may be controlled and/or monitored by one or more computing devices, such as an engine control (113), an advanced driver assistance system (ADAS) (111), an infotainment system (119), a storage device (117), a camera (115), etc.

For example, the advanced driver assistance system (ADAS) (111) may provide one or more features, such as Adaptive Cruise Control, Glare-Free High Beam and Pixel Light, Adaptive Light Control, Swiveling Curve Lights, Anti-Lock Braking, Automatic Parking, Automotive Navigation, Automotive Night Vision, Blind Spot Monitor, Pre-Crash Collision Avoidance, Crosswind Stabilization, Cruise Control, Driver Drowsiness Detection, Driver Monitoring, Electric Vehicle Warning Sounds, Emergency Driver Assistant, Forward Collision Warning, Intersection Assistant, Hill Descent Control, Intelligent Speed Adaptation, Intelligent Speed Advice, Lane Departure Warning, Lane Change Assistance, Night Vision, Parking Sensor, Pedestrian Protection, Rain Sensor, Surround View, Tire Pressure Monitoring, Traffic Sign Recognition, Turning Assistant, Vehicular Communication; Wrong-Way Driving Warning, Autopilot, ProPilot Assist, etc.

Some of the computing devices may have connected sensors to collect information related to the operation of the vehicle (101); and some of the computing devices may operate actuators to exert control on at least a portion of the vehicle (101). A battery (105) (and/or other power sources) provides power for the operations of the computing devices (111, 113, . . . , 119).

A computing device (e.g., 111, 113, . . . , 119) typically has a circuit board with components configured for a specific application. The application circuit board may have one or more microprocessors or microcontrollers, memory, software/firmware.

The computing device (e.g., 111, 113, . . . , 119) in the vehicle (101) are connected via a bus (103) for communication with each other and/or for sharing resources, such as the storage capacity of the storage device (117), the imaging capability of the camera (115), the processing power of the advanced driver assistance system (ADAS).

When the advanced driver assistance system (ADAS) (111) provides multiple features, the advanced driver assistance system (ADAS) can be implemented using multiple application boards that are connected to each other via the bus (103).

For example, the bus (103) can be implemented in accordance with predefined protocol specification, such as a specification for Peripheral Component Interconnect Express (PCI Express or PCIe) buses.

For example, the boards of the computing device (e.g., 111, 113, . . . , 119) may be connected in a chain via point to point serial connections.

For example, the boards of the computing device (e.g., 111, 113, . . . , 119) may be connected via point to point serial connections to one or more switches and/or a root complex to form the bus (103).

Connecting the computing device (e.g., 111, 113, . . . , 119) via the bus (103) allows the application boards to share resources and/or communicate with each other, directly or indirectly via the storage device (117).

For example, when the advanced driver assistance system (ADAS) has multiple application boards implementing multiple features, the application boards can be connected to the bus (103) to share the storage capacity of the storage device (117) and/or other peripheral resources, such as the camera (115), sensors, etc. Thus, different combinations of feature sets can be implemented via connecting selected boards to the bus (103).

Virtualization can be implemented to allow a degree of separations of different application boards that share a certain resource, such as the storage device (117). For example, Single Root Input/Output Virtualization (SR-IOV) and/or Multi Root Input/Output Virtualization (MR-IOV) can be used to facilitate sharing where the different applications are separated via virtual functions implemented in the shared hardware device, such as the storage device (117).

For example, the storage device (117) may present on the bus (103) a plurality of virtual functions of the storage device (117). Each virtual function of the storage device (117) is configured on a portion of the storage capacity of the storage device (117). Different virtual functions of the storage device (117) are assigned for use by different application boards. Thus, the operations of the application boards are substantially separate from each other, even though the application boards share the same storage device (117).

Alternative, the storage device (117) may implement multiple physical functions that are assigned for use by different application boards. However, implementing multiple physical functions increases the cost and reduces the flexibility in accommodating a varying number of application boards that can be connected for shared access to the storage device (117).

In some instances, multiple physical functions are implemented in the storage device (117) to improve the processing capability of the storage device (117); and virtual functions supported by the physical functions are assigned to the application boards. Thus, the application boards do not use the physical functions directly.

The use of the virtual functions of the storage device (117) provides the flexibility in partitioning the resources for sharing by a varying number of application boards, and the flexibility in assigning varying amounts of storage resources to different application boards.

Figure 2:
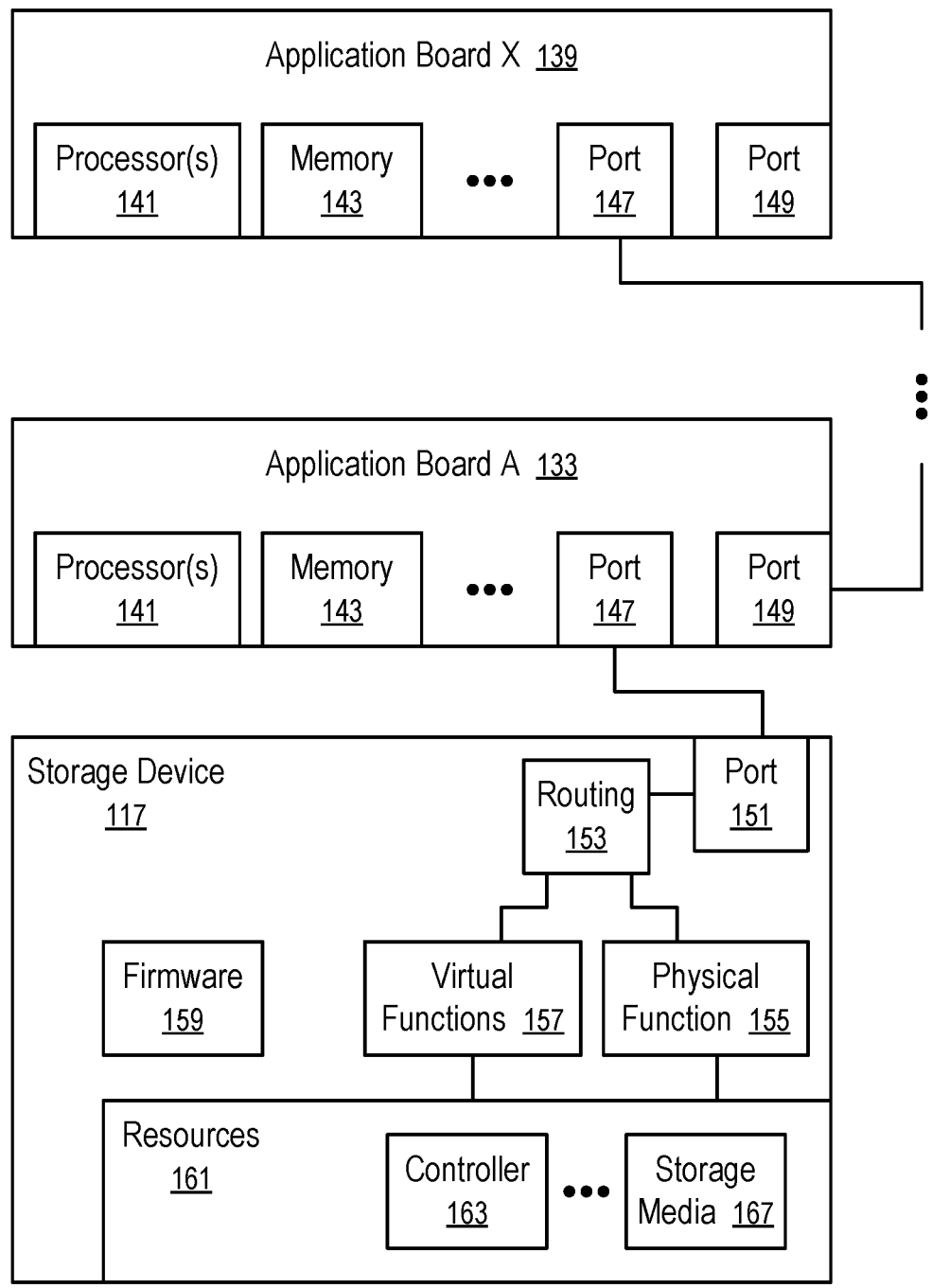
FIG. 2 illustrates a configuration of vehicle application boards connected to share storage media.

FIG. 2 illustrates a configuration of vehicle application boards connected to share storage media.

In the configuration of FIG. 2, the application boards (133, . . . , 139) and the storage device (117) are connected in a chain of point to point serial connections (e.g., in accordance with PCIe specification). Alternatively, the switch or a root complex may be used to interconnect the application boards (133, . . . , 139) and the storage device (117).

For example, the storage device (117) of FIG. 2 can be used to implement the storage device (117) of the vehicle (101) of FIG. 1; and the application boards (133, . . . , 139) can be used to implement at least some of the computing devices of the vehicle (101) of FIG. 1, such as the engine control (113), the advanced driver assistance system (ADAS) (111), and/or the infotainment system (119) of the vehicle (101). The serial connections between the ports (151, 147, 149) of the application boards (133, . . . , 139) and the storage device (117) implement at least part of the bus (103).

The storage device (117) of FIG. 2 includes a port (151) for connection to the bus (103). The storage device (117) has an internal routing (153) that provides requests received in the port (151) from the bus (103) to a corresponding virtual function (157) (or the physical function (155)). The virtual functions (157) are implemented via the physical function (155) running the firmware (159) to reduce cost. The physical function (155) uses resources (161) of the storage device (117) to provide data storage services. The resources (161) of the storage device (117) typically include a storage media (167), a controller (163) running the firmware (159), etc.

The application boards (133, . . . , 139) are connected to the bus (103) via ports (e.g., 147, 149). Some of the boards may have a plurality of ports connected via a switch for connection to other boards. In some instances, one of the boards (1333, . . . , 139) may implement a root complex for the bus (103).

A typical board (e.g., 133 or 139) has one or more processors (141) and memory (143) storing the instructions (software or firmware) of the board (e.g., 133 or 139). the instructions of the board implement at least one system image for accessing the virtual function (157) in the storage device (117). A virtual function (157) may be treated as a virtual storage device of the system image. Different system images in the application boards (133, . . . , 139) may be assigned to use different virtual functions to separate their operations from each other. Optionally, some of the system images may share a virtual function (157) and thus shared the data in the virtual function (157), which allows communications among the system images.

In some instances, some of the application boards (133, . . . , 139) also implements virtual functions to allow sharing of their resources on the bus (103). For example, the camera (115) can be connected to the bus (103) to provide a plurality of virtual camera functions supported by the operation of a physical camera function; and thus, the camera (115) can be shared by the application boards (133, . . . , 139) of the ADAS (111) and/or the infotainment system (119). In general, various resources on the vehicle (101) (e.g., front camera, rear camera, sensors, actuators) can be shared on the bus (103) in a similar way as the sharing of the storage device (117) and/or the camera (115) discussed herein.

For example, the camera (115) can be used, as resource available and shared on the bus (103), to transmit the images to a navigation system of the vehicle (101) and show real images in the infotainment system of the vehicle (101) to the driver in the short range (e.g., presented in popup windows showing pedestrian crossing, traffic lights, etc.). The same camera (115) can also share the image to the front LED light controller to reduce the beam power in response to detection of certain traffic signs or another vehicle arriving from the opposite direction, or to change the high of the beams depending from the presence of pedestrian, other vehicles, city scenarios, etc.

Figure 3:
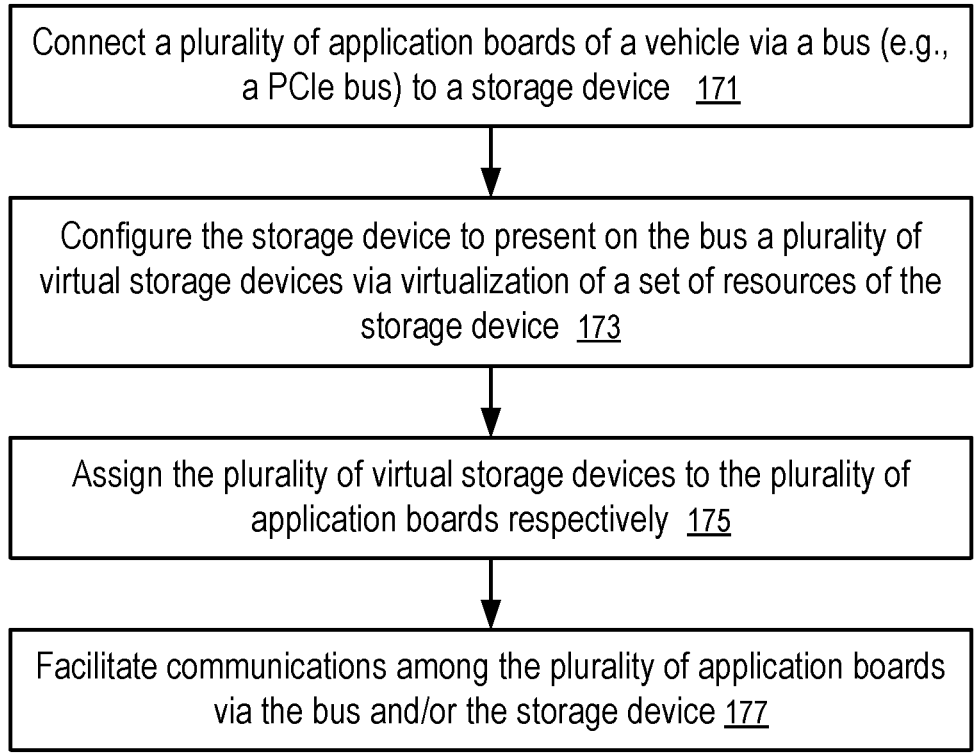
FIG. 3 shows a method to share storage capacity and communicate with each other among application boards of a vehicle.

FIG. 3 shows a method to share storage capacity and communicate with each other among application boards of a vehicle. For example, the method of FIG. 3 can be implemented in the vehicle (101) of FIG. 1 having application boards (133, . . . , 139) connected to the storage device (117) as illustrated in FIG. 2.

The method of FIG. 3 includes: connecting (171) a plurality of application boards (133, . . . , 139) of a vehicle (101) via a bus (103) (e.g., a PCIe bus) to a storage device (117); configuring (173) the storage device (117) to present on the bus (103) a plurality of virtual storage devices (157) via virtualization of a set of resources (163, . . . , 167) of the storage device (117); assigning (175) the plurality of virtual storage devices (157) to the plurality of application boards (133, . . . , 139) respectively; and facilitating (177) communications among the plurality of application boards (133, . . . , 139) via the bus (103) and/or the storage device (117).

For example, a vehicle (101) includes a plurality of application boards (133, . . . , 139), a storage device (117), and a bus (103) connecting the application boards (133, . . . , 139) to the storage device (117). The application boards (133, . . . , 139) share the storage device (117) on the bus (103).

For example, the bus (103) is in accordance with a specification of peripheral component interconnect express (PCIe); and the application boards (133, . . . , 139) share the storage device (117) on the bus (103) in accordance with a specification of single root input/output virtualization (SR-IOV) or a specification of Multi Root Input/Output Virtualization (MR-IOV).

For example, the storage device (117) is connected to the bus (103) via a point to point serial connection. The storage device provides a plurality of virtual functions (157) implemented by a physical function (155) running firmware (159). The physical function is implemented via resources (161), such as a controller (163) and a storage media (167). At least a portion of the storage media (167) is non-volatile. The plurality of virtual functions (157) are assigned to the plurality of application boards (133, . . . , 139) respectively. The plurality of application boards (133, . . . , 139) respectively access the plurality of virtual functions (157) as separate virtual storage devices through the same point to point serial connection from a port (151) of the storage device (117) to the bus (103). The application boards (133, . . . , 139) communicate with each other on the bus (103) via the storage device (117) and/or using data streams of read or write operations.

For example, the application boards (133) may implement one or more features of an advanced driver assistance system (ADAS) (114) of the vehicle (101), engine control (113) of the vehicle (101), and/or infotainment (119) of the vehicle (101). For example, one of the application boards (133) may control driving of the vehicle (101) (in accordance with user input and/or sensor input, or autonomously based on sensor measurements). For example, one of the application boards (133) may control the engine of the vehicle (101), which may be a brushless direct current motor. For example, one of the application boards (133) may control the brake of the vehicle (101) to prevent the wheels of the vehicle (101) from locking up and avoid uncontrolled skidding. For example, one of the application boards (133) may control infotainment of the vehicle (101). In some instances, multiple applications may run on the same application board. For example, multiple virtual machines may be operated as different system images in an application board to provide different features of ADAS (114).

The vehicle (101) may further include a camera (115) connected to the bus (103); and at least two of the application boards (133, . . . , 139) share the camera (115) on the bus (103).

Examples of computer storage devices (117) in general include hard disk drives (HDDs), solid state drives (SSDs), flash memory, dynamic random-access memory, magnetic tapes, network attached storage device, etc. The storage device (117) communications with the application boards (133, . . . , 139) using the bus (103). For example, the bus (1030 between the application boards (133, . . . , 139) and the storage device (117) is a PCIe bus in one embodiment; and the application boards (133, . . . , 139) and the storage device (117) communicate with each other using a specification of NVMe and/or a specification of SR-IOV.

In some implementations, the communication channel between the application boards (133, . . . , 139) and the storage device (117) may include a computer network, such as a local area network, a wireless local area network, a wireless personal area network, a cellular communications network, a broadband high-speed always-connected wireless communication connection (e.g., a current or future generation of mobile network link); and the application boards (133, . . . , 139) and the storage device (117) can be configured to communicate with each other using data storage management and usage commands similar to those in NVMe protocol.

The controller (163) of the storage device (117) runs firmware (159) to perform operations responsive to the communications from the application boards (133, . . . , 139). Firmware in general is a type of computer program that provides control, monitoring and data manipulation of engineered computing devices. The firmware (159) of the storage device (117) controls the operations of the controller (163) in operating the storage device (117), such as storing and accessing data in non-volatile storage media (167) of the storage device (117), etc.

Non-volatile storage media (167) in general may be implemented via various techniques, such as memory cells in an integrated circuit, magnetic material coated on rigid disks, etc. The storage media (167) is non-volatile in that no power is required to maintain the data/information stored in the non-volatile storage media (167), which data/information can be retrieved after the non-volatile storage media (167) is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media (167) is non-volatile and can retain data stored therein without power for days, months, and/or years.

The storage device (117) may use volatile Dynamic Random-Access Memory (DRAM) for the storage of run-time data and instructions used by the controller (163) to improve the computation performance of the controller (163) and/or provide buffers for data transferred between the application boards (133, . . . , 139) and the non-volatile storage media (167). DRAM is volatile in that it requires power to maintain the data/information stored therein, which data/information is lost immediately or rapidly when the power is interrupted.

Volatile DRAM typically has less latency than non-volatile storage media (167), but loses its data quickly when power is removed. Thus, it is advantageous to use the volatile DRAM to temporarily store instructions and data used for the controller (163) in its current computing task to improve performance. In some instances, the volatile DRAM is replaced with volatile Static Random-Access Memory (SRAM) that uses less power than DRAM in some applications. When the non-volatile storage media (167) has data access performance (e.g., in latency, read/write speed) comparable to volatile DRAM, the volatile DRAM can be eliminated; and the controller (163) can perform computing by operating on the non-volatile storage media (167) for instructions and data instead of operating on the volatile DRAM.

For example, cross point storage and memory devices (e.g., 3D XPoint memory) have data access performance comparable to volatile DRAM. A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (163) has in-processor cache memory with data access performance that is better than the volatile DRAM and/or the non-volatile storage media (167). Thus, it is preferred to cache parts of instructions and data used in the current computing task in the in-processor cache memory of the controller (163) during the computing operations of the controller (163). In some instances, the controller (163) has multiple processors, each having its own in-processor cache memory.

Optionally, the controller (163) performs data intensive, in-memory processing using data and/or instructions organized in the storage device (117). For example, in response to a request from the application board (133, . . . , or 139), the controller (163) performs a real time analysis of a set of data stored in the storage device (117) and communicates a reduced data set to the application board (133, . . . , or 139) as a response. For example, in some applications, the storage device (117) is connected to real time sensors to store sensor inputs; and the processors of the controller (163) are configured to perform machine learning and/or pattern recognition based on the sensor inputs to support an artificial intelligence (AI) system that is implemented at least in part via the storage device (117) and/or the application boards (133, . . . , 139).

In some implementations, the processors of the controller (163) are integrated with memory (e.g., 167) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

Some embodiments involving the operation of the controller (163) can be implemented using computer instructions executed by the controller (163), such as the firmware (159) of the controller (163). In some instances, hardware circuits can be used to implement at least some of the functions of the firmware. The firmware can be initially stored in the non-volatile storage media (167), or another non-volatile device, and loaded into the volatile DRAM and/or the in-processor cache memory for execution by the controller (163).

A non-transitory computer storage medium can be used to store instructions of the firmware (159) of the storage device (117). When the instructions are executed by the controller (163) of the computer storage device (117), the instructions cause the controller (163) to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus, comprising:
a plurality of application boards installable in a vehicle;
a plurality of virtual functions configured to be assigned to the plurality of application boards respectively;
a storage device; and
a bus connecting the application boards to the storage device, wherein the application boards share the storage device on the bus,
wherein the storage device is connected to the bus via a point to point serial connection,
wherein the bus is in accordance with a specification of peripheral component interconnect express (PCIe),
wherein the application boards share the storage device on the bus in accordance with a specification of multi root input/output virtualization (MR-IOV),
wherein the storage device is configured to present, on the bus, a plurality of virtual storage devices via virtualization of a set of resources of the storage device via the specification of MR-IOV, and
wherein the application boards are configured to respectively access the virtual functions as the virtual storage devices through the point to point serial connection.

2. The apparatus of claim 1, wherein the storage device provides the plurality of virtual functions.

3. The apparatus of claim 1, wherein the plurality of application boards respectively access the plurality of virtual functions as separate virtual storage devices via the point to point serial connection to a port on the storage device.

4. The apparatus of claim 1, wherein the plurality of virtual functions is implemented via a controller and a storage media.

5. The apparatus of claim 1, wherein the application boards communicate with each other on the bus via the storage device.

6. The apparatus of claim 1, wherein the application boards communicate with each other on the bus using data streams of read or write operations.

7. The apparatus of claim 1, wherein the application boards include at least one board implementing a feature of an advanced driver assistance system (ADAS).

8. The apparatus of claim 1, wherein the application boards include a board implementing engine control of the vehicle.

9. The apparatus of claim 1, wherein the application boards include a board implementing infotainment of the vehicle.

10. The apparatus of claim 1, further comprising:
a camera connected to the bus.

11. The apparatus of claim 10, wherein the camera is shared by at least two of the application boards.

12. A method, comprising:
providing a bus in a vehicle in accordance with a protocol of peripheral component interconnect express (PCIe);
connecting a plurality of application boards to the bus;
connecting a storage device to the bus via a point to point serial connection;
sharing the storage device on the bus in accordance with a protocol of multi root input/output virtualization (MR-IOV);
presenting on the bus, by the storage device, a plurality of virtual storage devices via virtualization of a set of resources of the storage device according to the MR-IOV;
assigning the plurality of virtual storage devices to the plurality of application boards respectively; and
accessing, by the application boards, a plurality of virtual functions as the virtual storage devices through the point to point serial connection.

13. The method of claim 12, further comprising:
controlling engine of the vehicle using one of the application boards.

14. The method of claim 13, further comprising:
controlling driving of the vehicle using one of the application boards.

15. The method of claim 14, further comprising:
controlling infotainment of the vehicle using one of the application boards.

16. The method of claim 15, further comprising:
communicating among the application boards using the bus.

17. A non-transitory computer-readable storage medium tangibly encoded with computer-executable instructions, that when executed by a processor of a computing device, causes the processor to perform a method, the method comprising:
providing a bus in a vehicle in accordance with a protocol of peripheral component interconnect express (PCIe);
connecting a plurality of application boards to the bus;
connecting a storage device to the bus via a point to point serial connection;
sharing the storage device on the bus in accordance with a protocol of multi root input/output virtualization (MR-IOV);
presenting on the bus, by the storage device, a plurality of virtual storage devices via virtualization of a set of resources of the storage device according to the MR-IOV;
assigning the plurality of virtual storage devices to the plurality of application boards respectively; and
accessing, by the application boards, a plurality of virtual functions as the virtual storage devices through the point to point serial connection.

18. The apparatus of claim 1, wherein the plurality of virtual storage devices is configured to be assigned to the plurality of application boards respectively.

19. The apparatus of claim 1, wherein
a board of the plurality of application boards is configured to communicate with other application boards of the plurality of application boards via the storage device using data streams of read or write operations.

20. The apparatus of claim 1, wherein a board of the plurality of application boards is configured to communicate with other application boards of the plurality of application boards using read or write operations.

* * * * *